US012705250B2

(12) United States Patent
Ganesan et al.

(10) Patent No.: US 12,705,250 B2
(45) Date of Patent: Aug. 11, 2026

(54) VERIFIABLE LOGICAL REASONING USING GENAI

(71) Applicant: Oracle International Corporation, Redwood Shores, CA (US)

(72) Inventors: Dharma Ganesan, Baltimore, MD (US); David Clifton, Columbia, MD (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/043,263

(22) Filed: Jan. 31, 2025

(65) Prior Publication Data

US 2026/0228232 A1 Aug. 6, 2026

(51) Int. Cl.
*G06F 16/00* (2019.01)
*G06F 16/248* (2019.01)

(52) U.S. Cl.
CPC .................................. *G06F 16/248* (2019.01)

(58) Field of Classification Search
CPC ..................................................... G06F 16/248
USPC .................................................. 707/600–899
See application file for complete search history.

(56) References Cited

U.S. PATENT DOCUMENTS 10,095,230 B1 * 10/2018 Hardin ................. G05D 1/0088
2020/0073783 A1 * 3/2020 Hortala ..................... G06F 9/54
2024/0296294 A1 9/2024 Imani et al.
2025/0111220 A1 * 4/2025 Jones ....................... G06N 3/08
2025/0131200 A1 * 4/2025 Tiwari .................... G06F 40/30
2025/0200392 A1 * 6/2025 Whalen .................. G06N 5/013
2025/0202719 A1 * 6/2025 Gaddam ............... H04L 9/3271
2025/0300925 A1 * 9/2025 Gatherer ................ H04L 43/55
2025/0378283 A1 * 12/2025 Krishnamani .......... G06F 40/58

FOREIGN PATENT DOCUMENTS

CN 118014056 A 5/2024

OTHER PUBLICATIONS

Dong, Kefan et al., “Formal Theorem Proving by Rewarding LLMs to Decompose Proofs Hierarchically,” arXiv, Nov. 4, 2024, retrieved online via https://arxiv.org/pdf/2411.01829v1, 20 pages.

(Continued)

*Primary Examiner* — Michelle N Owyang
(74) *Attorney, Agent, or Firm* — Mughal Gaudry & Franklin PC

(57) ABSTRACT

Some embodiments relate to techniques including: accessing a prompt that is associated with a logical reasoning problem; generating one or more logical steps of a logical response based on the prompt by using a generative artificial intelligence (GenAI) model; for each of the one or more logical steps of the logical response: querying one or more theorem solvers using the logical response and the logical reasoning problem; receiving, in response to the query, one or more feedback from the one or more theorem solvers corresponding to the logical response of the logical reasoning problem; and updating the logical response based on the one or more feedback; determining that the logical response is complete and verified from the one or more theorem solvers; and outputting, in response to determining that the logical response is complete and verified, the logical response on a user interface.

20 Claims, 7 Drawing Sheets

(56) References Cited

OTHER PUBLICATIONS

First, Emily et al., "Baldur: Whole-Proof Generation and Repair with Large Language Models," arXiv, Nov. 1, 2024, retrieved online via https://arxiv.org/pdf/2303.04910, 15 pages.
Ganguly, Debargha et al., "Proof of Thought : Neurosymbolic Program Synthesis allows Robust and Interpretable Reasoning," arxiv, Sep. 2024, retrieved online via https://arxiv.org/pdf/2303.04910, 24 pages.
Haji, Fatemeh et al., "Improving LLM Reasoning with Multi-Agent Tree-of-Thought Validator Agent," arXiv, Sep. 2024, retrieved online via https://www.researchgate.net/publication/384115481_Improving_LLM_Reasoning_with_Multi-Agent_Tree-of-Thought_Validator_Agent, 11 pages.
Jiang, Albert Q et al., "Thor: Wielding Hammers to Integrate Language Models and Automated Theorem Provers," arXiv, May 22, 2022, retrieved online via https://arxiv.org/pdf/2205.10893, 15 pages.
Lightman, Hunter et al., "Let's Verify Step by Step," arXiv, May 31, 2023, retrieved online via https://arxiv.org/pdf/2305.20050, 29 pages.
Lu, Minghai et al., "Proof Automation with Large Language Models," ResearchGate, Sep. 2024, retrieved online via https://www.researchgate.net/publication/384266504_Proof_Automation_with_Large_Language_Models, 12 pages.
Poesia, Gabariel et al., "Certified Deductive Reasoning With Language Models," arXiv, Nov. 8, 2023, retrieved online via https://arxiv.org/pdf/2306.04031, 22 pages.
Polu, Stanislas et al., "Generative Language Modeling for Automated Theorem Proving," arXiv, Sep. 7, 2020, retrieved online via https://arxiv.org/pdf/2009.03393, 20 pages.
Thakur, Amitayush et al., "An In-Context Learning Agent for Formal Theorem-Proving," arXiv, Aug. 8, 2024, retrieved online via https://arxiv.org/pdf/2310.04353, 27 pages.
Wang, Chaojie et al., "Q*: Improving Multi-step Reasoning for LLMs with Deliberative Planning," arXiv, Jun. 27, 2024, retrieved online via https://arxiv.org/pdf/2406.14283v3, 11 pages.
Wang, Peiyi et al., "Math-Shepherd: Verify and Reinforce LLMs Step-By-Step Without Human Annotations," arXiv, Feb. 19, 2024, available online via https://arxiv.org/pdf/2312.08935, 15 pages.
Xin, Huajian et al., "DeepSeek-Prover: Advancing Theorem Proving in LLMs through Large-Scale Synthetic Data," arXiv, May 23, 2024, retrieved online via https://arxiv.org/pdf/2405.14333v1, 17 pages.
International Search Report and Written Opinion for PCT Application No. PCT/US2026/010346 mailed May 13, 2026.
Kirtania et al., "LOGIC-LM++: Multi-Step Refinement for Symbolic Formulations", Aug. 2024. Arxiv.org Cornell University Library. Ithaca, NY. URL: https://arxiv.org/abs/2407.02514.
Olausson et al., "Linc: A Neurosymbolic Approach for Logical Reasoning by Combining Language Models with First-Order Logic Provers", Feb. 2024. Proceedings of the 2023 Conference on Empirical Methods in Natural Language Processing. pp. 1-24. DOI: 10.18653/vl/2023.emnlp-main.313.
Pan et al., "Logic-LM: Empowering Large Language Models with Symbolic Solvers for Faithful Logical Reasoning", Oct. 2023. Arxiv.org Cornell University Library. Ithaca, NY. DOI: https://doi.org/10.48550/arXiv.2305.12295.

* cited by examiner

| | | |
|---|---|---|
| 1. | $\forall x(Q(x) \rightarrow R(x))$ | Premise |
| 2. | $\exists x(P(x) \wedge Q(x))$ | Premise |
| 3. | \| $[a]\ P(a) \wedge Q(a)$ | Assumption (for ∃ elimination) |
| 4. | \| $P(a)$ | ∧ elimination (3) |
| 5. | \| $Q(a)$ | ∧ elimination (3) |
| 6. | \| $Q(a) \rightarrow P(a)$ | ∀ elimination (1) |
| 7. | \| $R(a)$ | → elimination (5,6) |
| 8. | \| $P(a) \wedge R(a)$ | ∧ introduction (4,7) |
| 9. | \| $\exists x(P(x) \wedge R(x))$ | ∃ introduction (8) |
| 10. | $\exists x(P(x) \wedge R(x))$ | ∃ introduction (2,3-9) |

*FIG. 3A*

Construct a proof for the argument: $\forall x(Qx \rightarrow Rx)$, $\exists x(Px \wedge Qx) \therefore \exists x(Px \wedge Rx)$

| | | |
|---|---|---|
| 1 | $\forall x(Qx \rightarrow Rx)$ | |
| 2 | $\exists x(Px \wedge Qx)$ | |
| 3 | $Pa \wedge Qa$ | |
| 4 | $Qa \rightarrow Ra$ | ∀E 1 |
| 5 | $Qa$ | ∧E 3 |
| 6 | $Ra$ | →E 4, 5 |
| 7 | $Pa$ | ∧E 3 |
| 8 | $Pa \wedge Ra$ | ∧I 6, 7 |
| 9 | $\exists x\ (Px \wedge Rx)$ | ∃I 8 |
| 10 | $\exists x(Px \wedge Rx)$ | ∃E 2, 3-9 |

NEW LINE NEW SUBPROOF

Congratulations! This proof is correct.

CHECK PROOF START OVER

*FIG. 3B*

VERIFIABLE LOGICAL REASONING USING GENAI

BACKGROUND

Logical reasoning is a core capability that may be needed across numerous real-life applications, including conversational agents, automated code analysis, security systems, and more. For instance, in chatbots, logical reasoning can enable meaningful and coherent responses during complex conversations. Similarly, in code analysis, logical reasoning may support the identification of vulnerabilities or optimization opportunities. Moreover, security systems can rely on logical reasoning to infer potential threats or breaches from observed patterns. With the emergence of generative artificial intelligence (GenAI), such GenAI models have shown impressive capabilities in understanding textual and structured data (e.g., source code). GenAI models may also draw conclusions through logical reasoning about the textual and structured data.

However, the GenAI (or the GenAI models) may suffer from notable challenges or limitations in solving multi-step logical reasoning problems, for example, tasks involving logic puzzles, mathematical proofs, or analytical reasoning. While GenAI models may produce reasonable solutions to such problems, the GenAI models can also generate outputs comprising logical flaws or incomplete reasoning chains. Due to this limitation, the output of the GenAI models may not be trustable and may cause serious issues in scenarios or applications where the reliability and accuracy of the reasoning process are important. For instance, an error in reasoning in a security system can result in overlooking a significant vulnerability, while flawed logic in a generated code review may lead to undetected bugs.

Further, even when GenAI may provide seemingly accurate solutions to logical reasoning problems, the trustworthiness of these solutions can remain uncertain. Current GenAI models lack a mechanism to verify the logical consistency or correctness of their outputs. This ambiguity can limit the utility of the GenAI models in applications where verifiable and dependable reasoning may be preferred. Without a method or technique to verify the absence of logical flaws, users may need to manually validate the results, which can undermine the efficiency and scalability benefits of using GenAI for such tasks.

Therefore, demand exists for systems, methods, or techniques that can enhance the logical reasoning capabilities of the GenAI models while generating verifiable outputs. More specifically, a technique that may enable step-by-step validation of reasoning, ensure logical consistency, and highlight potential flaws in generated solutions can greatly enhance trust and reliability of the generated solutions. Such technological advancements may mitigate the current limitations of GenAI and unlock its potential in various domains, ensuring efficient and trustworthy applications of logical reasoning.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 3A shows an illustrative example of a predicate logic proof that is generated using the logical reasoning architecture in accordance with some embodiments of the present disclosure.

FIG. 3B shows an illustrative example of verification of the predicate logic proof using a proof checker in accordance with some embodiments of the present disclosure.

DETAILED DESCRIPTION

Figure 1:
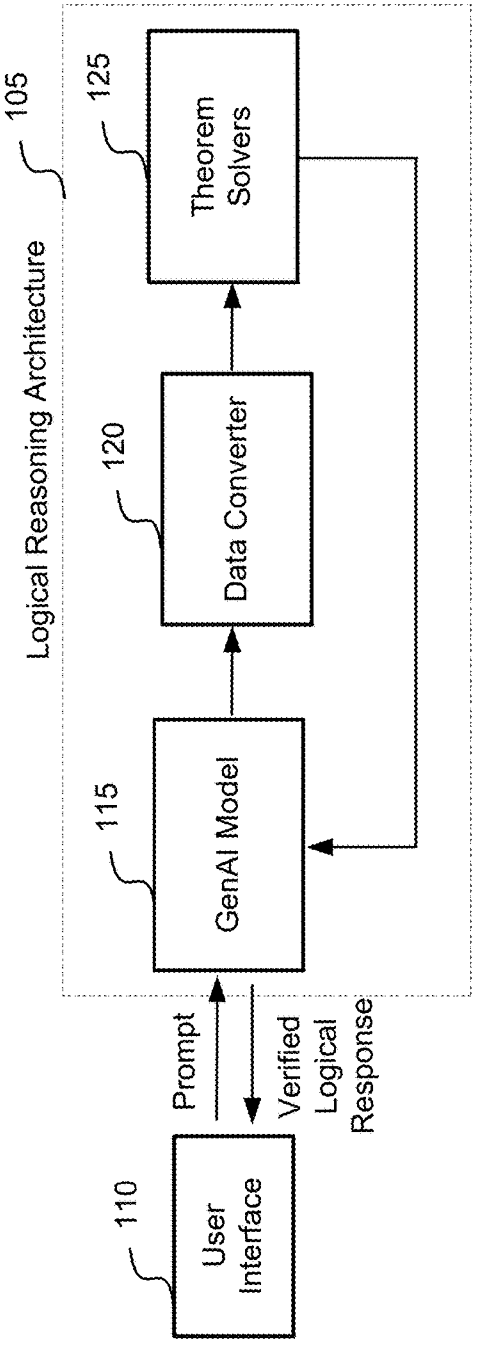
FIG. 1 shows an example network for performing a method to generate a verified logical response based on a prompt from a user in accordance with some embodiments of the present disclosure.

Some embodiments of the present disclosure relate to integration of theorem provers with a GenAI model (e.g., large language model LLM) to provide a verifiable or trustable solution of a multi-step logical reasoning problem. The GenAI model may formulate the multi-step logical reasoning problem based on an input prompt from a user. In some instances, the GenAI model may generate a step-by-step solution (or a logical response) to a given logical problem from a user. To verify correctness of each step, the output of the GenAI model corresponding to each step may be converted into logical statements that are understandable by the theorem provers. The output of one or more theorem provers is provided as feedback to the GenAI model to modify the logical response (or a proof) if a flaw is detected in any of the steps of the solution (or the logical response). According to some embodiments, a technical solution is provided in the present disclosure to a technical problem of enhancing the GenAI's ability to solve multi-step logical reasoning problems in a verified manner.

GenAI technologies may generate logical errors when solving multi-step logical reasoning problems. Sometimes GenAI models may apply the foundational rules or axioms of logic incorrectly while solving multi-step logical reasoning problems that lead to a wrong proof or a logical response. Currently, users have to verify whether the GenAI technologies are producing correct results or not. Thus, for solving multi-step logical reasoning problems using the GenAI models, the output of the GenAI models may not be accurate and cannot be trustable. Humans or experts in the loop may be needed to verify the correctness of the output of the GenAI models, which is not feasible and scalable for practical implementation of GenAI technologies.

According to some embodiments of the present disclosure, a technique is disclosed that takes advantage of GenAI's ability to generate logical steps (also referred herein as proof or logical response) and utilizes well-established theorem provers to verify correctness and/or generating feedback for the GenAI. Theorem provers and/or proof checkers are tools used in formal logic, mathematics, and computer science to verify the validity of logical statements or mathematical proofs. Theorem provers can verify whether a proof is correct or not and often theorem provers are not able to generate proofs. Some theorem provers may have a potential to generate proofs, which are usually not as readable and logically structured as the output of the GenAI. Furthermore, users (or humans) have to properly formalize a problem for the theorem provers to analyze and generate solutions. The techniques disclosed in the present disclosure advance the GenAI's ability to solve multi-step logical problems in a verified manner.

In some instances, the GenAI model may generate one step (or logical step) at a time of a proof (or a logical response). In other instances, the GenAI model may generate multiple steps at a time of the proof (or the logical response). For each step, the output of the GenAI model may be converted into logical statements for one or more theorem provers to verify whether the axioms or rules of logic are correctly followed. If the one or more theorem provers find a flaw, then a feedback can be sent to the GenAI to correct the flaw and to regenerate that logical step of the proof. Otherwise, if the output is correct then the GenAI may generate the next logical step of the proof.

In some embodiments, a GenAI cloud platform may provide access to one or more GenAI models through a GenAI service to the users. The one or more GenAI models may include but not limited to large language models (LLMs) such as Llama, GPT, Claude, Gemini, Grok etc. The one or more GenAI models may further include retrieval-augmented generation (RAG) model, a fine-tuned transformer model, or a domain-specific model that is trained on domain-specific data.

According to some aspects of the present disclosure, different types of theorem provers and proof checkers may be utilized to verify the correctness of each logical step and to make sure whether rules of natural deduction, logic, or axioms are correctly followed by the GenAI models or LLMs. In some instances, Boolean satisfiability (SAT) based theorem provers may be employed along with proof checkers that verify the rules of natural deduction. Moreover, in some instances, SAT-based theorem provers and/or proof checkers can also work in parallel to verify multiple independent steps of the LLM generated proof concurrently. SAT-based theorem provers may include but not limited to Z3, CVC5, Yices, or MathSAT. Moreover, theorem provers may further include automated theorem provers (ATPs) such as E, Vampire, Prover9, SPASS for first-order logic problems. Similarly, proof checkers may include but are not limited to Twelf, ACL2, or Metamath.

Further, the techniques disclosed in the present disclosure can be used with different types of logic, including but not limited to propositional logic, first order logic (also known as predicate logic), second order logic, higher-order logic, linear logic, intuitionistic logic, or algebraic logic.

GenAI and theorem provers may be rooted in different models of computation. The former technology (GenAI) is based on artificial neural networks that can be constructed based on training on a vast amount of data, including text, math rules, or source code. The latter technology (theorem provers) is based on the relevant axioms or rules of mathematics. The present disclosure discloses integration of these two different technologies to solve multi-step logical reasoning problems. GenAI has potential to generate solutions of multi-step problems such as solving a logical puzzle, mathematical proofs, or tasks involving analytical reasoning. To verify the correctness of the generated solution, a human in the loop method may not work that undermine the efficiency and scalability benefits of using GenAI for such tasks (multi-step problems). The GenAI generated proofs may be converted into logical statements such as in propositional logic or predicate logic for theorem provers to check the correctness. The techniques disclosed in the present disclosure integrate GenAI with external theorem provers for verification, without modifying the internal workings of both technologies. Thus, appropriate models may be selected from both technologies based on the domain and context of the multi-step problem. Hence, the disclosed technique is agnostic to both GenAI and theorem prover technologies. In some instances, an underlying architecture of GenAI may be modified to directly interact with a built-in theorem prover in order to improve performance efficiency.

Further, some theorem provers can solve multi-step problems such as generating proofs of theorems only if the problem statement is formalized by a human or a user. Moreover, the generated proof is often not presented in a format that is easily understandable by humans. Another advantage of the present disclosure is that disclosed technique utilizes GenAI to generate proofs which are readable by humans and machines. Since GenAI is trained on a large volume of data, a precise or proper formulation of the multi-step problem may not be needed. GenAI models can understand the meaning of notations (e.g., A v B means either A or B is true) without a human precisely defining the involved notations and axioms.

The present disclosure enhances trust, accuracy, and reliability of GenAI response for prompts that include logical reasoning tasks in particular. The disclosed techniques can be used in many real-world applications that demand correct logical reasoning, for example, healthcare diagnosis systems, software or hardware verification, artificial intelligence (e.g., chatbots, virtual assistants, explainable AI), or cybersecurity, etc.

FIG. 1 shows an example network 100 for performing a method to generate verified logical response based on a prompt from a user in accordance with some embodiments of the present disclosure. Example network 100 comprises a logical reasoning architecture 105 and a user interface 110. The logical reasoning architecture 105 may include a GenAI model 115, a data converter 120, and theorem solvers 125.

The user interface 110 may represent an interface of an application, a web-based application, or a cloud-app and may be accessed on a device, for example, a tablet, a laptop, a desktop computer, a computer server, and the like. A user may interact with the user interface 110 to input or generate a prompt. The user may further utilize the user interface 110 to read and respond to a verified logical response from the logical reasoning architecture 105. In some instances, the user interface 110 may be a dedicated application with a custom designed graphical user interface (GUI).

The user interface 110 (or a user device) may utilize a network to communicate with the logical reasoning architecture 105. The network may comprise of any form of communication network including public, private, internet, switch, routers, firewalls, and/or similar networks facilitating collaboration, information flow, and seamless connectivity between end nodes. In some embodiments, the network may be a collection of interconnected devices, such as computers, servers, and routers, communicating with each other, enabling data exchange and resource sharing. In other embodiments of present disclosure, the network may be a local area network (LAN) covering a small geographical area with high data transfer rates using ethernet cables or Wi-Fi. The network may be a wide area network (WAN) covering extensive geographical distances and connecting multiple LANs together and/or may include a metropolitan area network (MAN) connecting multiple LANs within a specific organization territory such as hospitals, offices and the like. The other forms of the network with reference to the present disclosure may include any campus area network (CAN), storage area network (SAN) and/or a virtual private network (VPN) to create a secure encrypted connection over a public network (usually the internet). Moreover, the selection of a network may depend on factors like scalability, security, and performance requirements.

The logical reasoning architecture 105 may be implemented in part or all on a GenAI cloud platform. The logical reasoning architecture 105 may be accessed using a GenAI service. In some other instances, the GenAI service may comprise an application or set of applications deployed in a cloud-based platform providing virtualized resources, for example, oracle cloud infrastructure (OCI), amazon web services (AWS), and Google cloud. In some instances, the data converter 120 and/or the theorem solvers 125 can be present or implemented on a remote or a different computing machine as compared to the GenAI model 115.

The GenAI service may provide access to one or more GenAI models that can generate proof (or logical response) in response to a prompt. In some embodiments of the present disclosure, the GenAI service may include text-based GenAI services to output logical steps with justifications and in tabular format for better readability. The one or more GenAI models may include but are not limited to generative pre-trained transformers (GPTs), Gemini, Grok, Claude, Llama and the like. According to some embodiments of the present disclosure, executing the GenAI service may refer to executing the GenAI model 115 through cloud service providers, offering pre-built models, APIs and infrastructures. In other instances, the GenAI service may include a custom GenAI model or solution that may be trained on propriety data or domain-specific data, for example, mathematical rules, axioms, specific logic type etc.

The GenAI model 115 may include a reference to line numbers and rules of logic as a justification for each logical step of a proof. According to present disclosure, each generated proof or the output of the GenAI model 115 at each logical step along with the corresponding lines (or reference lines) that are used to deduce the output, may be converted into logical statements by the data converter 120. The data converter 120 can be used to transform the output of the GenAI model 115 into a format that is understandable by a specific theorem prover of the theorem solvers 125. Thus, the data converter 120 may convert the generated proofs (via GenAI based on the prompt) into assertions for the theorem solvers 125 to validate the correctness.

The theorem solvers 125 may include various types of theorem provers and proof checkers to verify the correctness of each logical step and to make sure whether rules of natural deduction, logic, or axioms are correctly followed by the GenAI model 115. In some instances, the theorem solvers 125 may employ SAT-based theorem provers that focus on whether a given logical formula is satisfiable. SAT-based theorem provers may include but not limited to Z3, CVC5, Yices, or MathSAT. Moreover, in other instances, both SAT-based theorem provers and proof checkers can be used to verify each step of the LLM generated proof. The proof checkers may include but are not limited to Twelf, ACL2, or Metamath. Moreover, theorem provers may further include automated theorem provers (ATPs) such as E, Vampire, Prover9, SPASS for first-order logic problems.

The output of the theorem solvers 125 may be provided as feedback to the GenAI model 115. The GenAI model 115 may modify the proof if a flaw is detected in any of the (logical) steps of the solution or the logical response. The techniques disclosed in the present disclosure can be used with various types of logic such as propositional logic, first-order logic, higher-order logic, or other notations etc.

In one example, a logical puzzle which is made of six constraints can be considered to better explain some of the techniques disclosed in the present disclosure. The GenAI model 115 is asked to solve the logical puzzle and conclude that no member can be added to a club. The GenAI model 115 successfully formalized the logical problem and generated a mathematical proof using the rules of natural deduction and concluded that no member can be added to the club. The six constraints of the logical puzzle are:

1. Every non-Scottish member wears red socks.
2. Every member wears a kilt or doesn't wear red socks.
3. The married members don't go out on Sunday.
4. A member goes out on Sunday if and only if he is Scottish.
5. Every member who wears a kilt is Scottish and married.
6. Every Scottish member wears a kilt.

A specific GenAI technology such as Claude is used as the GenAI model 115. A first prompt, "Can you write this puzzle in symbols?", is given to the GenAI model 115 (Claude). The GenAI model 115 (Claude) response is as follows:

Symbols:

S: Scottish
R: Wears red socks
K: Wears a kilt
M: Married
O: Goes out on Sunday

Afterwards, a second prompt is provided to the GenAI model 115, which is "Can you prove using natural deduction rules that no member can be added to this club?". The GenAI model 115 (Claude) response is as follows:

Premise:

$\neg S \rightarrow R$
$K \vee \neg R$
$M \rightarrow \neg O$
$S \leftrightarrow O$
$K \rightarrow (S \wedge M)$
$S \rightarrow K$ Proof:

1. S Assumption (for contradiction)
2. $S \rightarrow K$ Premise 6
3. K 1, 2, Modus Ponens
4. $K \rightarrow (S \wedge M)$ Premise 5
5. $S \wedge M$ 3, 4, Modus Ponens
6. M 5, Conjunction Elimination
7. $S \leftrightarrow O$ Premise 4
8. O 1, 7, Biconditional Elimination
9. $M \rightarrow \neg O$ Premise 3
10. $\neg O$ 6, 9, Modus Ponens
11. $O \wedge \neg O$ 8, 10, Conjunction Introduction
12. $\neg S$ 1-11, Reductio ad Absurdum
13. $\neg S \rightarrow R$ Premise 1
14. R 12, 13, Modus Ponens
15. $K \vee \neg R$ Premise 2
16. K 14, 15, Disjunctive Syllogism
17. $K \rightarrow (S \wedge M)$ Premise 5

18. S∧M 16, 17, Modus Ponens

19. S 18, Conjunction Elimination

20. S∧¬S 12, 19, Contradiction

The GenAI model 115 also reported a summary at the end of the proof: "Therefore, we have derived a contradiction (S∧¬S) from our premises, proving that no member can satisfy all the rules of the club simultaneously. This proof demonstrates that regardless of whether we assume a member is Scottish (S) or not Scottish (¬S), we end up with a contradiction. This means that the rules of the club are inconsistent, and no member can be added while satisfying all the rules." Even though a proof is generated automatically by the GenAI model 115, the user may have no evidence that the proof is correct such that there are no logical flaws in the reasoning process of the GenAI model 115. The present disclosure integrates a verification process of each step of the proof using the theorem solvers 125. At each step of the proof, the GenAI model 115 also provides a reference to line numbers and rules of logic. The theorem solvers 125 may utilize these references to validate the correctness of each step of the proof (or logical response).

In another example, the GenAI model 115 is asked via prompt to generate a proof for the following problem statement.

Premises:

1. ~(p→q)
2. ~p v s

Goal: Prove ~(s→q)

The symbols '~' and '¬', are used interchangeably in the present disclosure and both represent 'negation', which is a logical operation that inverts a truth value of a proposition. A fragment of the solution or the proof that is generated by the GenAI model 115 is:

1. ~(p→q) Premise
2. ~p v s Premise
3. s→q Assumption (for reductio ad absurdum)
4. p Assumption
5. q 3, 4, Modus Ponens (MP)

While generating the proof, the GenAI model 115 (e.g., Claude) may introduce a flaw in reasoning. For example, line number 5 has a flaw in that the GenAI model 115 does not apply the rules of logic correctly. The GenAI model 115 does not correctly use the Modus Ponens on lines 3 and 4. According to the disclosed technique, the fragment of the solution or the proof may be converted into logical statements for the theorem solvers 125 (e.g., Z3) to understand the fragment (or step) and verify. For the above fragment of the proof, the following encoding is generated using the data converter 120 and is passed to Z3 to verify the claim at line 5 that q can be inferred from assumptions on line 3 and 4. The data converter 120 may be comprised of a parser that automates this encoding process.

```
p, q, s=Bools('p q s') #declare three variables of the Boolean type
premise_1=Not(Implies(p, q))
premise_2=Or(Not(p), s)
premise_3=Implies(s, q)
premise_4=p
conclusion=q
prove(Implies(And(premise_1, premise_2, premise_3, prime_4), conclusion))
```

The above logical statements are sent to the theorem solvers 125 (e.g., Z3) to prove the above conclusion (q, based on premises). The theorem prover Z3 concluded that this is not provable. The conclusion cannot be reached from the given premises. Based on the theorem prover Z3 output, feedback is sent to the GenAI model 115 that step 5 of the generated proof is wrong. The GenAI model 115 (e.g., Claude) responded as "You're absolutely right, and I apologize for that error. Thank you for pointing it out. You're correct that we can't derive q in step 5 as I incorrectly stated. Let's revise the proof, being more careful and precise with our reasoning." The GenAI model 115 (e.g., Claude) accepted the feedback and ended up generating a new proof. Again, the generated proof is converted into logical statements via the data converter 120 for the theorem solvers 125 to verify correctness. The GenAI model 115 can also be asked (using prompt) to generate proofs in a tabular format to parse easily and convert them into logical statements for the theorem provers such as Z3. For example, the output of the GenAI model 115 is shown in Table 1.

TABLE 1

A fragment of generated proof of the above example.

| Line No: | Statement | Justification |
|---|---|---|
| 1: | ~(p → q) | Premise |
| 2: | ~p ∨ s | Premise |
| 3: | p ∧ ~q | 1, Logical equivalence |
| 4: | p | 3, Conjunction elimination |

The data converter 120 may parse the fragment of generated proof (as shown in Table 1) and may construct a new program (e.g., logical statements) to verify the correctness so far. For example, to verify step 3 is correct, the following logical statements can be constructed:

```
p, q, s=Bools ('p q s') #declare three variables of the Boolean type
premise_1=Not(Implies(p, q))
premise_2=Or(Not(p), s)
conclusion=And(p, Not(q))
prove(Implies(And(premise_1, premise_2), conclusion))
```

The output of the theorem prover Z3 is 'proved' meaning that the conclusion is reachable from the given premises. Afterwards, the GenAI model 115 may proceed to generate the next step of the proof and so on until a solution or a verified logical response of the given prompt is generated.

Figure 2:
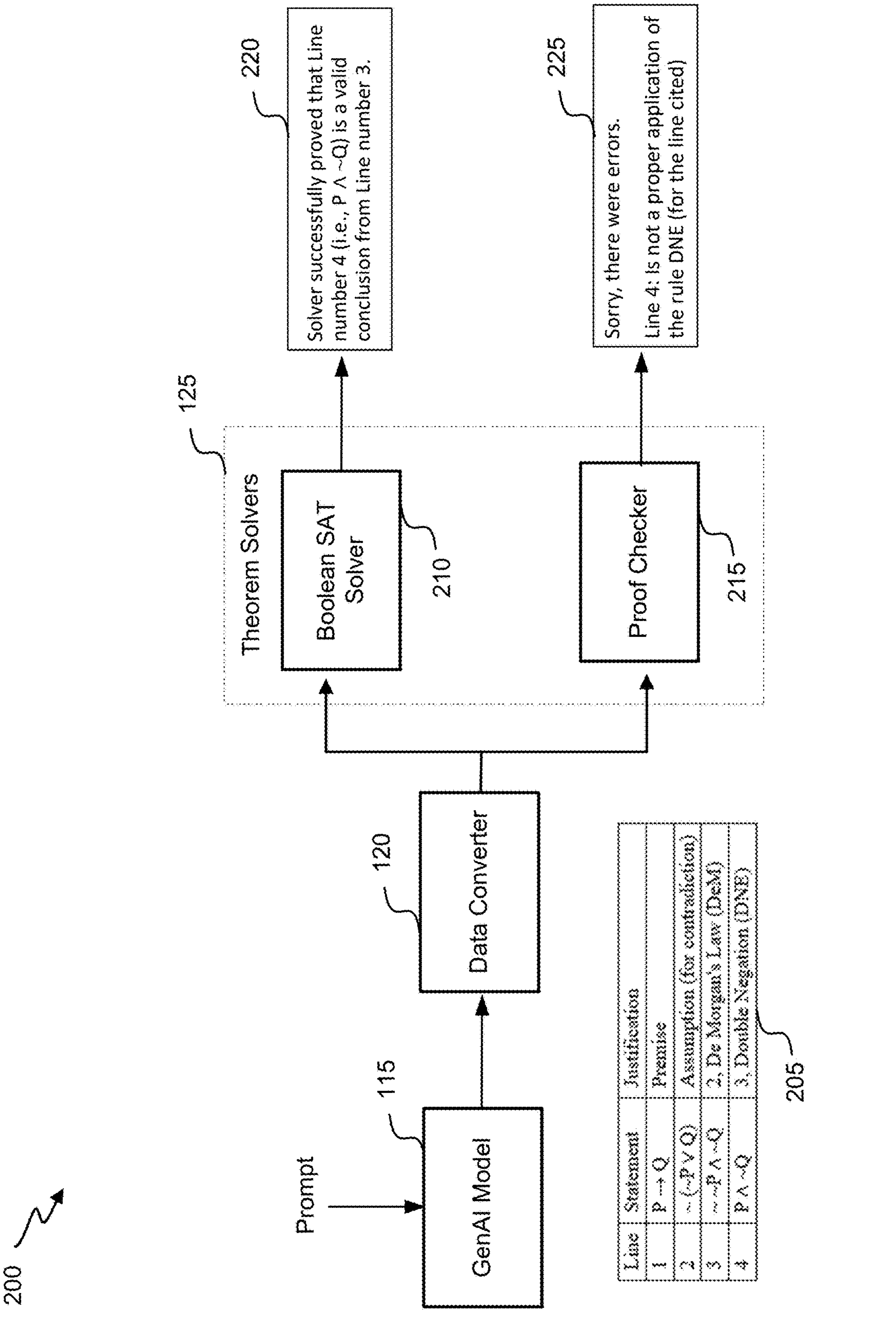
FIG. 2 illustrates an iteration of generating the verified logical response using a logical reasoning architecture of FIG. 1 in accordance with an example implementation of the present disclosure.

FIG. 2 illustrates an iteration of generating the verified logical response using the logical reasoning architecture 105 in accordance with an example implementation of the present disclosure. The example implementation also demonstrated that SAT-based verification may not be sufficient to verify that the LLM generated proofs (or output of the GenAI model 115) follow the rules of natural deduction correctly. For instance, if the LLM or the GenAI model 115 may skip intermediate steps of a proof, then the SAT-based theorem provers may not detect such mistakes.

According to some embodiments, the theorem solvers 125 may include both theorem provers and proof checkers. In the example implementation, a Boolean SAT solver 210 is used as the theorem prover. For proof checker 215, a proof logic verifier is used (available at https://proofs.openlogicproject.org, which is hereby incorporated in its entirety for all purposes). Moreover, LLM such as Claude is used as the GenAI model 115. The proof checker 215 can be employed to check whether the LLM generated proofs are using the rules of natural deduction correctly. Further, the Boolean SAT solver 210 is a SAT-based theorem prover which supports satisfiability modulo theories (SMT) and can reason about arithmetic, arrays, bit-vectors, and more. Boolean SAT solver 210 is a high-performance theorem prover and is widely used in software verification and symbolic execution.

The iteration of generating the verified logical response as shown in FIG. 2 is based on a prompt such as 'Let us consider a logical problem. If it rains, the grass is wet. This logical statement implies either there is no rain, or the grass is wet. Please generate a proof using the logical rules of natural deduction step-by-step'. Based on the input prompt, the LLM (Claude) or the GenAI model 115 generated a symbolic representation of the problem as follows:

P: It rains

Q: Grass is wet

The theorem is $P \rightarrow Q = \sim P \vee Q$, where '→' refers to 'implies', '~' represents 'not', and '∨' is the Boolean 'or' operator. For this proof, the LLM (or the GenAI model 115) decided to use a proof by contradiction strategy as shown in line number 2 of Table 2 and generated a first step.

TABLE 2

Step 1-Applying DE Morgan's Law (generated by the LLM); see line 3.

| Line No: | Statement | Justification |
|---|---|---|
| 1: | $P \rightarrow Q$ | Premise |
| 2: | $\sim(\sim P \vee Q)$ | Assumption (for contradiction) |
| 3: | $\sim\sim P \wedge \sim Q$ | 2, DeM |

To verify the intermediate conclusion (e.g., logical step) of line number 3 of TABLE 2 is correct, the LLM generated proof is converted into logical statements for the Boolean SAT solver 210 as follows:

```
P, Q=Bools('P Q')
premise_1=Not(Or(Not(P), Q))
conclusion=And(Not(Not(P)), Not(Q))
prove(Implies(premise_1, conclusion))
```

The Boolean SAT solver 210 successfully proved that line number 3 (i.e., $\sim\sim P \wedge \sim Q$) is reachable from the assumption in line 2 (i.e., $\sim(\sim P \vee Q)$).

However, the SAT-based solvers such as the Boolean SAT solver 210 may not verify whether the LLM or the GenAI model 115 generated proof is using the rules of natural deduction (i.e., justification) correctly. Thus, the theorem solvers 125 may utilize another theorem prover that can check whether the justification is correctly followed by the LLM or the GenAI model 115. The proof checker 215 utilized the justification data generated by the LLM and verified it. The proof checker 215 generated the following output 'No errors yet, but you have not reached the conclusion'.

After successful verification of the step 1 or iteration 1, the GenAI model 115 may proceed to generate the next step of the proof. In the next or second iteration, generated output 205 by the GenAI model 115 is also shown in TABLE 3 below. This time, the GenAI model 115 made a mistake in the justification that it does not use the double not elimination (DNE) rule of propositional logic correctly. To verify line 4 is correct, the following code is sent to the Boolean SAT solver 210.

```
P, Q=Bools('P Q')
premise_1=And(Not(Not(P)), Not(Q))
conclusion=And(P, Not(Q))
prove(Implies(premise_1, conclusion))
```

The Boolean SAT solver 210 generated a response 220 based on the above code. The response 220 comprises the following statement, 'Solvere successfully proved that line number 4 (i.e., $P \wedge \sim Q$) is a valid conclusion from the line number 3'.

TABLE 3

Applying Double Not Elimination (Generated by LLM); see line 4.

| Line No: | Statement | Justification |
|---|---|---|
| 1: | $P \rightarrow Q$ | Premise |
| 2: | $\sim(\sim P \vee Q)$ | Assumption (for contradiction) |
| 3: | $\sim\sim P \wedge \sim Q$ | 2, DeM |
| 4: | $P \wedge \sim Q$ | 3, DNE |

Afterwards, the data converter 120 provided the generated output 205 to the proof checker 215 in appropriate format. The proof checker 215, for example, the proof logic verifier found a flaw that was missed by the Boolean SAT solver 210 (e.g., due to scope limitations) is that the double not elimination (DNE) cannot be applied to line number 3 of TABLE 3. The proof checker response 225 includes the following statements, 'Sorry, there were errors. Line 4: is not a proper application of the rule DNE (for the line cited)'. The proof checker response 225 is provided as feedback to the GenAI model 115. The LLM or the GenAI model 115 responded to the feedback as: 'Yes, you are right. When applying DNE, we can only eliminate double negation of a single statement. In line 3 we have a conjunction ($\sim\sim P \wedge \sim Q$), so we need to apply DNE to $\sim\sim P$ separately. Let me correct this:'. An updated response is generated by the LLM and is shown in TABLE 4 below.

TABLE 4

The LLM corrected the mistake in the generated proof.

| Line No: | Statement | Justification |
|---|---|---|
| 1: | $P \rightarrow Q$ | Premise |
| 2: | $\sim(\sim P \vee Q)$ | Assumption (for contradiction) |
| 3: | $\sim\sim P \wedge \sim Q$ | 2, DeM |
| 4: | $\sim\sim P$ | 3,∧E |

Thus, the process or iterations continued to verify each step of the LLM generated proof by using both Boolean SAT solver 210 and the proof checker 215 (proof logic verifier) until a complete proof or a verified logical response is generated. The GenAI model 115 may then send the verified logical response to the user interface 110 for the user.

According to example implementation, proofs or logical responses are verified step-by-step by letting the LLM generate only one step of the proof. The intermediate proof can be converted into a SAT problem based on the line or step numbers that are relevant for the current proof. If Boolean SAT solver 210 (or the proof checker 215) generates a counterexample, then the LLM (or the GenAI model 115) can be informed that the recent line/step number is wrong. The LLM may receive the feedback and tries to correct the proof, and this process continues until the proof is fully verified. Furthermore, the disclosed technique can also use SAT-based theorem provers in parallel to verify multiple independent steps of the LLM generated proof concurrently.

In the above example, propositional logic is used that deals with simple statements (propositions) and their connectives (e.g., AND, OR, NOT, IMPLIES). The proposed technique can also be used with other types of logic, for example, predicate logic, higher order logic, etc.

FIG. 3A shows an illustrative example of a predicate logic proof that is generated using the logical reasoning architecture 105 in accordance with some embodiments of the present disclosure. The GenAI model 115 was used to generate both the symbolic representation and a solution using the axioms or rules of predicate logic. The GenAI model 115 (Claude) was asked (using a prompt) to mathematically model the following argument in first order logic, 'If all quakers are reformists and if there is a protestant who is also a quaker, then there must be a protestant who is also a reformist'. The GenAI model 115 generated a symbolic representation of the above natural language text as shown in next paragraph.

'Let me help solve this proof using first order logic. Let's break it down step by step. First, let's define our predicates: Let Q(x) mean "x is a quaker"; Let R(x) mean "x is a reformist"; Let P(x) mean "x is a protestant". The argument can be formalized as:

Premise 1: $\forall x(Q(x)\rightarrow R(x))$ (All quakers are reformists)

Premise 2: $\exists x(P(x)\wedge Q(x))$ (There exists someone who is both protestant and quaker)

Conclusion: $\exists x(P(x)\wedge R(x))$ (There exists someone who is both protestant and reformist)'.

Afterwards, another prompt was given to the GenAI model 115, which is 'Is it possible to generate a proof using the rules of natural deduction?'. The GenAI model 115 generated the predicate logic proof as shown in FIG. 3A. In predicate logic notation, a vertical line (e.g., in lines 3-9 of FIG. 3A) indicates a scope of an assumption. In line number 3, [a] is indicative of a fresh or new variable 'a' that does not appear before. Moreover, the scope of the assumption runs from line 3 to line 9. Since, variable 'a' is introduced only within the scope of the assumption and thus the conclusion at line 10 cannot contain 'a'. In order to verify whether the generated proof is correct, the theorem solvers 125 may be utilized.

FIG. 3B shows an illustrative example of verification of the predicate logic proof using the proof checker 215 in accordance with some embodiments of the present disclosure. The proof checker 215 utilized the proof logic verifier to verify the predicate logic proof. FIG. 3B shows that the proof steps are logically consistent, and the predicate logic proof generated by the GenAI model 115 is logically correct or valid.

The illustrative examples of FIG. 2, FIG. 3A, and FIG. 3B, demonstrate that the disclosed technique enables verified logical reasoning by systematically integrating GenAI and theorem provers. Further, the disclosed technique is also applicable to different logical notations such as propositional logic, first-order logic (or predicate logic), and the like. It will be appreciated that the theorem solvers 125 (or theorem provers) are not generating a proof. The theorem solvers 125 (e.g. the proof checker 215) only check whether the steps of the proofs are correct and/or using the axioms or rules of natural deductions correctly. The proof itself is generated by GenAI technology which cannot verify whether the proof is correct. Thus, the disclosed technique in the present disclosure combines both fundamental approaches such as GenAI technology and the theorem provers.

Figure 4:
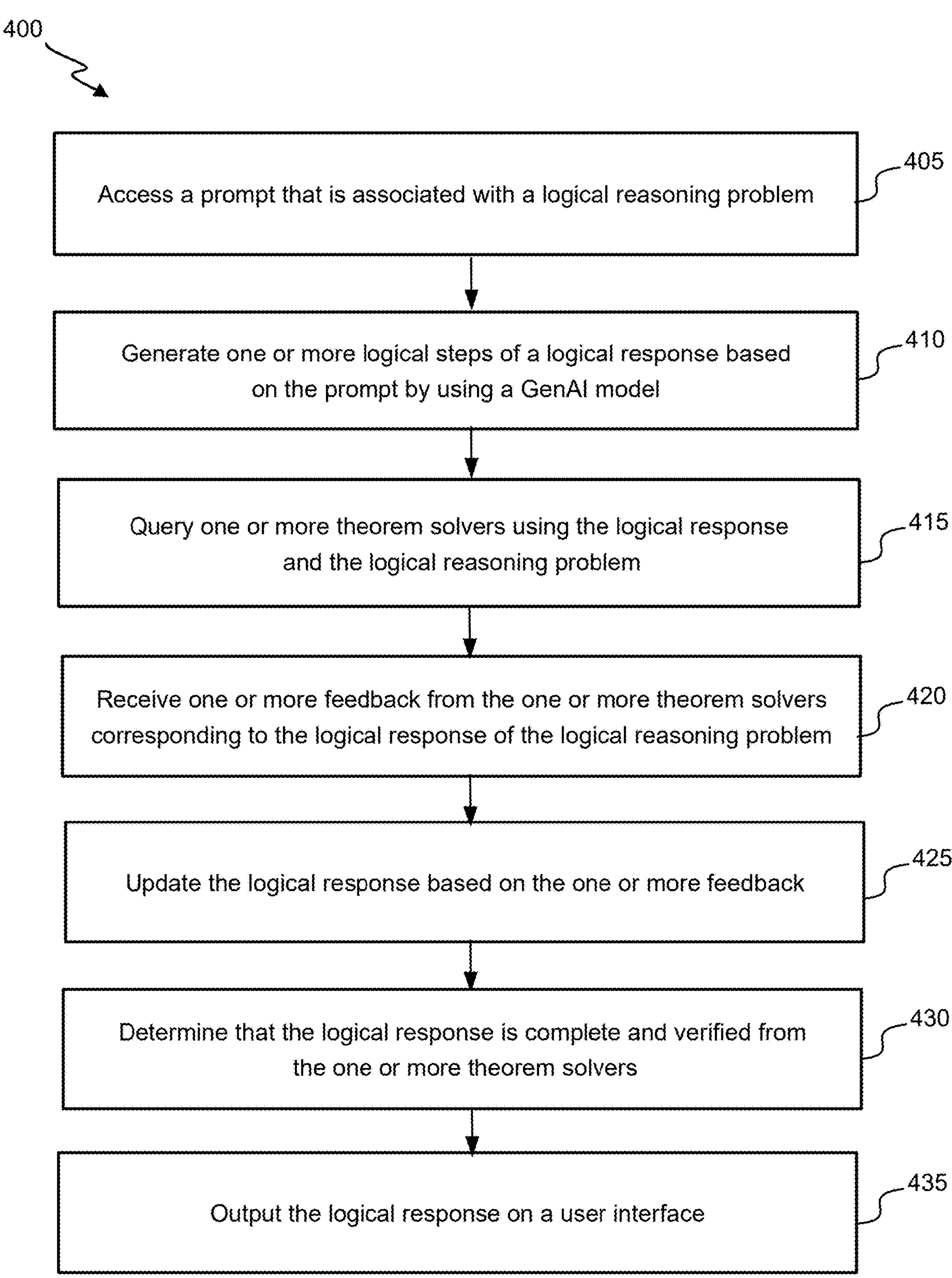
FIG. 4 shows an example flowchart of a system to generate the verified logical response based on the prompt by using a GenAI model and theorem solvers in accordance with some embodiments of the present disclosure.

FIG. 4 shows an example flowchart of a system to generate a verified logical response based on a prompt by using the GenAI model 115 and the theorem solvers 125 in accordance with some embodiments of the present disclosure. The blocks in flowchart 400 are illustrated in a specific order, while the order can be modified, for example, some blocks may be performed before other, and some blocks may be performed simultaneously. The blocks can be performed by hardware or software or a combination thereof. The process at block 405 may include accessing a prompt that is associated with a logical reasoning problem. The prompt is generated by a user using the user interface 110.

One or more logical steps of a logical response may be generated by using the GenAI model 115 based on the prompt, at block 410. In some instances, one step of the logical response is generated at a time. In other instances, multiple steps of the logical response can be generated. The GenAI model 115 may include but not limited to generative pre-trained transformer (GPT), Claude, Gemini, Llama, Grok, and the like. The GenAI model 115 may further include a retrieval-augmented generation (RAG) model, a fine-tuned transformer model, or a domain-specific model that is trained on domain-specific data.

Afterwards, for each step of the one or more logical steps of the logical response, a set of logical statements may be generated for each of one or more theorem solvers. The set of logical statements may be in a format that is understandable by a corresponding theorem solver. The one or more theorem solvers may include SAT-based theorem solvers. The one or more theorem solvers may further include proof checkers. In some instances, both SAT-based theorem provers and the proof checkers may be utilized.

The process at block 415 may include querying one or more theorem solvers using the logical response and the logical reasoning problem. One or more feedback may be received from the one or more theorem solvers corresponding to the logical response of the logical reasoning problem, at block 420. The one or more feedback from the one or more theorem solvers may include whether a logical step of the logical response is reachable based on a set of premises (or justification) and/or whether rules or axioms of natural deduction are correctly utilized. Furthermore, the GenAI model 115 may update the logical response based on the one or more feedback, at block 425.

The process at block 430 may include determining that the logical response is complete and verified from the one or more theorem solvers. Finally, at block 435, in response to determining that the logical response is complete and verified, the logical response may be output on the user interface 110.

Figure 5:
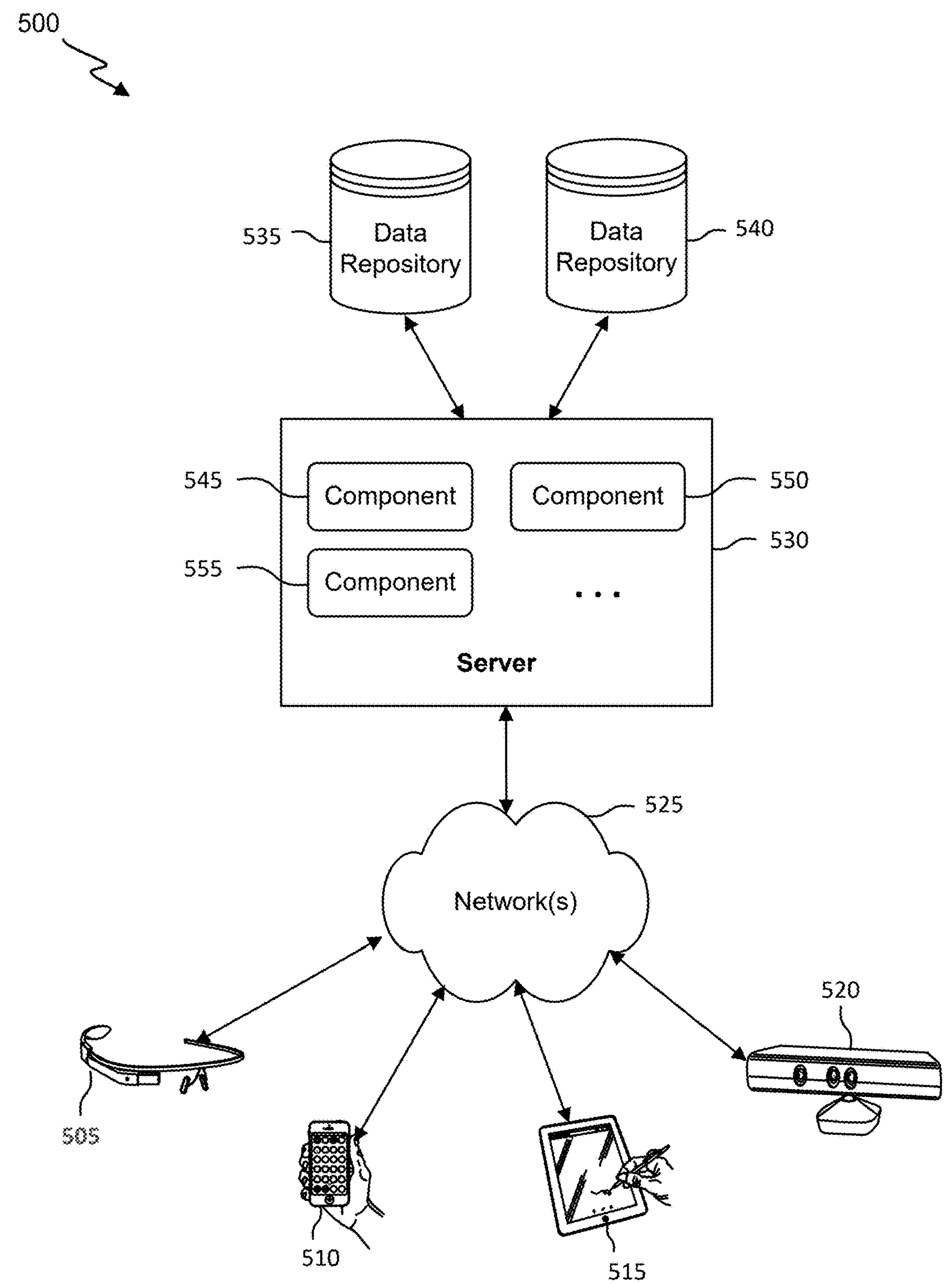
FIG. 5 illustrates a simplified diagram of an example distributed system for a cloud hosting a GenAI platform or the logical reasoning architecture.

FIG. 5 illustrates a simplified diagram of an example distributed system 500 for a cloud hosting a GenAI platform or the logical reasoning architecture 105. In the illustrated example, the distributed system 500 includes one or more client computing devices 505, 510, 515, and 520, coupled to a the server 530 via one or more communication networks 525. The clients computing devices 505, 510, 515, and 520 may be configured to execute one or more applications interact with the server 530 to access and utilize the GenAI platform securely integrated within a cloud environment, such as Oracle cloud integrated with Cohere. Within this framework, the server 530 is configured to host and manage a range of services or software applications, facilitating seamless integration and operation of the GenAI platform.

In various aspects, the server 530 may extend its capabilities to encompass additional services or software applications. These services may span both virtual and non-virtual environments, enabling a comprehensive and adaptable infrastructure for securely deploying GenAI solutions within the cloud ecosystem. In some respects, these services may be offered as web-based or cloud services, such as under a Software as a Service (SaaS) model to the users of the client computing devices 505, 510, 515, and/or 520. Users operating the client computing devices 505, 510, 515, and/or 520 may in turn utilize one or more client applications to interact with the server 530 to utilize the services provided by these components. Furthermore, client computing devices 505, 510, 515, and/or 520 may in turn utilize one or more client applications to initiate and manage specific tasks or analyses within the GenAI platform.

In the configuration depicted in FIG. 5, the server 530 may include one or more components 545, 550 and 555 that implement the functions performed by the server 530. These components may include software components that may be executed by one or more processors, hardware components, or combinations thereof. It should be appreciated that various system configurations are possible, which may differ from distributed system 500. The example shown in FIG. 5 is thus one example of a distributed system for implementing an example system and is not intended to be limiting.

Users may initiate requests for the GenAI platform through client computing devices 505, 510, 515, and/or 520 for inference or other machine-learning tasks. A client device may provide an interface that enables a user of the client device to interact with the GenAI platform or the logical reasoning architecture 105. The client device may also output information to the user via this interface. Although FIG. 5 depicts only four client computing devices, any number of client computing devices may be supported providing scalability and accessibility within the integrated GenAI platform on the cloud.

The client devices may include various types of computing systems, such as portable handheld devices, general purpose computers, such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems, such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various applications, such as various Internet-related apps, communication applications (e.g., E-mail applications, short message service (SMS) applications) and may use various communication protocols.

Network(s) 1025 may be any type of network familiar to those skilled in the art that can support data communications using any of a variety of available protocols, including without limitation TCP/IP (transmission control protocol/internet protocol), SNA (systems network architecture), IPX (internet packet exchange), AppleTalk®, and the like. Merely by way of example, network(s) 1025 can be a local area network (LAN), networks based on ethernet, token-ring, a wide-area network (WAN), the internet, a virtual network, a virtual private network (VPN), an intranet, an extranet, a public switched telephone network (PSTN), an infra-red network, a wireless network (e.g., a network operating under any of the institute of electrical and electronics (IEEE) 1002.11 suite of protocols, Bluetooth®, and/or any other wireless protocol), and/or any combination of these and/or other networks.

The server 530 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 530 can include one or more virtual machines running virtual operating systems, or other computing architectures involving virtualization, such as one or more flexible pools of logical storage devices that can be virtualized to maintain virtual storage devices for the server. In various aspects, the server 530 may be adapted to run one or more services or software applications that provide the functionality described in the foregoing disclosure.

The computing systems in the server 530 may run one or more operating systems including any of those discussed above, as well as any commercially available server operating system. The server 530 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

Distributed system 500 may also include one or more data repositories 535, 540. Data repositories 535, 540 may reside in many locations. For example, a data repository used by the server 530 may be local to server 1030 or may be remote from the server 530 and in communication with the server 530 via a network-based or dedicated connection. Data repositories 535, 540 may be of different types. In some instances, a data repository used by the server 530 may be a database, for example, a relational database, such as databases provided by Oracle Corporation® and other vendors. One or more of these databases may be adapted to enable storage, update, and retrieval of data to and from the database in response to structured query language (SQL)-formatted commands. In some aspects, one or more data repositories 535, 540 may also be used by applications to store application data. The data repositories used by applications may be of different types, such as, for example, a key-value store repository, an object store repository, or a general storage repository supported by a file system.

Figure 6:
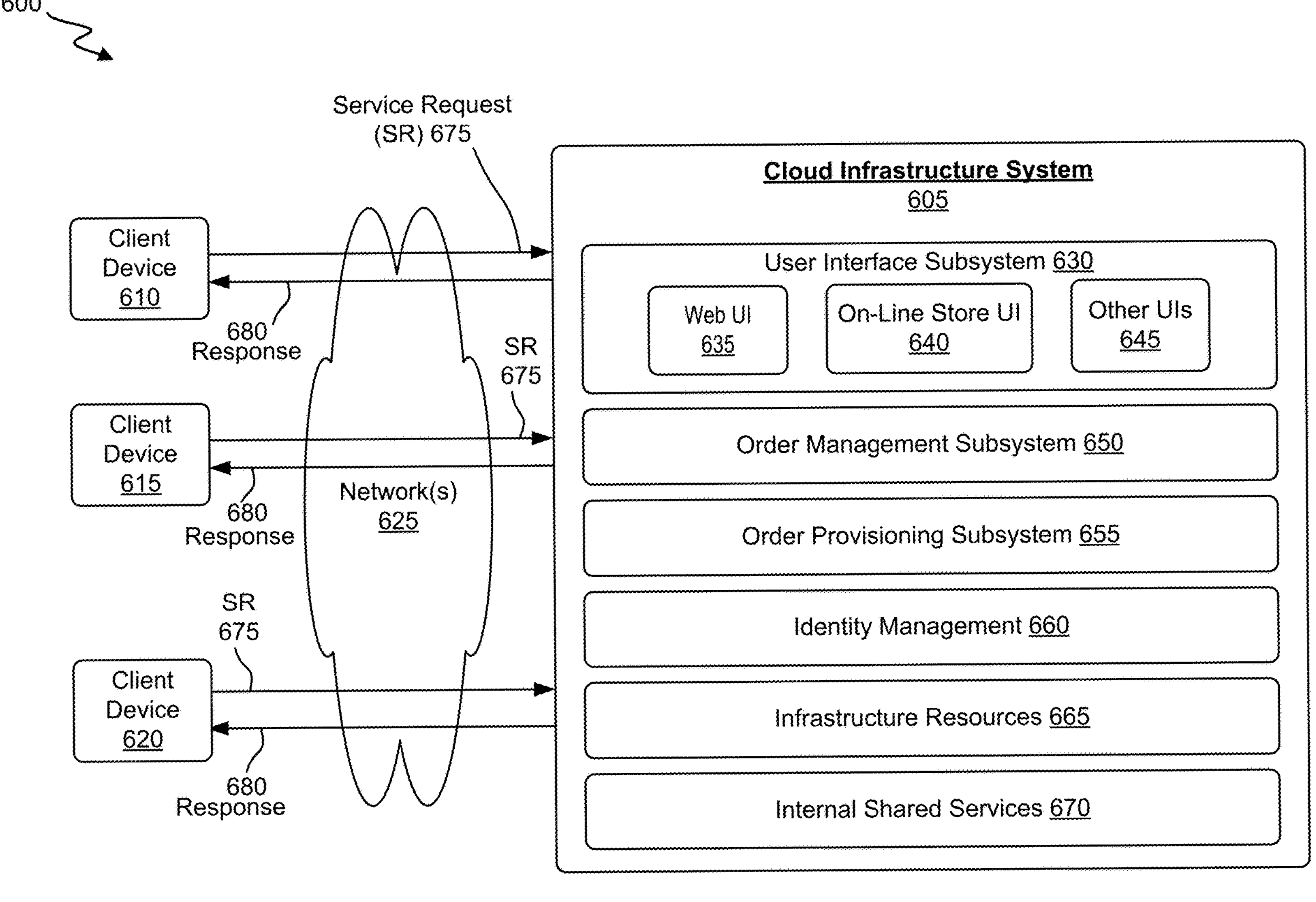
FIG. 6 is a simplified block diagram of a cloud-based system environment in which various services of a server of FIG. 5 may be offered as cloud services, in accordance with some aspects of the present disclosure.

FIG. 6 is a simplified block diagram of a cloud-based system environment in which various services of the server 530 of FIG. 5 may be offered as cloud services, in accordance with certain aspects. In the illustrative example depicted in FIG. 6, cloud infrastructure system 605 may provide one or more cloud services that may be requested by users using one or more client devices 610, 615, and 620. Cloud infrastructure system 605 may comprise one or more computers and/or servers that may include those described for server 530. The computers in cloud infrastructure system 605 may be organized as general-purpose computers, specialized server computers, server farms, server clusters, or any other appropriate arrangement and/or combination.

Network(s) 625 may facilitate communication and exchange of data between client devices 610, 615, and 620 and cloud infrastructure system 605. Network(s) 625 may include one or more networks. The networks may be of the same or different types. Network(s) 625 may support one or more communication protocols, including wired and/or wireless protocols, for facilitating the communications.

The illustrative example depicted in FIG. 6 is only one example of a cloud infrastructure system 605 and is not intended to be limiting. It should be appreciated that, in some other aspects, cloud infrastructure system 605 may have more or fewer components than those depicted in FIG. 6, may combine two or more components, or may have a different configuration or arrangement of components. For example, although FIG. 6 depicts three client computing devices, any number of client computing devices may be supported in alternative aspects.

The term cloud service is generally used to refer to a service that is made available to users on demand and via a communication network, such as the internet by systems (e.g., cloud infrastructure system 605) of a service provider. Typically, in a public cloud environment, servers and systems that make up the cloud service provider's system are different from the client's own on-premises servers and systems. The cloud service provider's systems are managed by the cloud service provider. Clients can thus avail themselves of cloud services provided by a cloud service provider without having to purchase separate licenses, support, or hardware and software resources for the services. For example, a cloud service provider's system may host an application, and a user may, via a network 625 (e.g., the internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as middleware services, database services, Java cloud services, and others.

In certain aspects, cloud infrastructure system 605 may provide one or more cloud services using different models, such as under a Software as a Service (SaaS) model, a Platform as a Service (PaaS) model, an Infrastructure as a Service (IaaS) model, and others, including hybrid service models. Cloud infrastructure system 605 may include a suite of applications, middleware, databases, and other resources that enable provision of the various cloud services.

A SaaS model enables an application or software to be delivered to a client over a communication network like the Internet, as a service, without the client having to buy the hardware or software for the underlying application. For example, a SaaS model may be used to provide clients access to on-demand applications that are hosted by cloud infrastructure system 605. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a client as a cloud service to provide elastic compute and storage capabilities. Various IaaS services are provided by Oracle Corporation®.

A PaaS model is generally used to provide, as a service, platform and environment resources that enable clients to develop, run, and manage applications and services without the client having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a client, via a subscription order, may order one or more services provided by cloud infrastructure system 605. Cloud infrastructure system 605 then performs processing to provide the services requested in the client's subscription order. Cloud infrastructure system 605 may be configured to provide one or even multiple cloud services.

Cloud infrastructure system 605 may provide cloud services via different deployment models. In a public cloud model, cloud infrastructure system 605 may be owned by a third-party cloud services provider and the cloud services are offered to any general public client, where the client can be an individual or an enterprise. In certain other aspects, under a private cloud model, cloud infrastructure system 605 may be operated within an organization (e.g., within an enterprise organization) and services provided to clients that are within the organization. For example, the clients may be various departments of an enterprise, such as the Human Resources department, the payroll department, etc. or even individuals within the enterprise. In certain other aspects, under a community cloud model, the cloud infrastructure system 605 and the services provided may be shared by several organizations in a related community. Various other models, such as hybrids of the above-mentioned models may also be used.

Client devices 610, 615, and 620 may be of several types (such as client computing devices 505, 510, 515, and 520 depicted in FIG. 5) and may be capable of operating one or more client applications. A user may use a client device to interact with cloud infrastructure system 605, such as to request a service provided by cloud infrastructure system 605. For instance, a user might employ a client device to execute real-time data querying operations within the cloud. A GenAI client may use a client device, such as a laptop to interact with the GenAI platform integrated within cloud infrastructure system. The client may request GPU-accelerated computing instances of the cloud for training deep learning models. The cloud may provide the necessary resources, and the GenAI client may monitor and manage the training process through the laptop. Upon completion, the client may retrieve the trained models and results.

In certain aspects, to facilitate efficient provisioning of these resources for supporting the various cloud services provided by cloud infrastructure system 605 for different clients, the resources may be bundled into sets of resources or resource modules. Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 605 may comprise multiple subsystems. These subsystems may be implemented in software, or hardware, or combinations thereof. As depicted in FIG. 6, the subsystems may include a user interface subsystem 630 that enables users or clients of cloud infrastructure system 605 to interact with cloud infrastructure system 605. User interface subsystem 630 may include various interfaces, such as a web user interface 635, an online store interface 640 where cloud services provided by cloud infrastructure system 605 are advertised and are purchasable by a consumer, and other interfaces 645. For example, a client may, using a client device, request (service request 675) one or more services provided by cloud infrastructure system 605 using one or more of interfaces 635, 640, and 645. For example, a client may access the online store, browse cloud services offered by cloud infrastructure system 605, and place a subscription order for one or more services offered by cloud infrastructure system 605 that the client wishes to subscribe to. The service request may include information identifying the client and one or more services that the client desires to subscribe to. For example, a client may place a subscription order for a Chabot related service offered by cloud infrastructure system 605. As part of the order, the client may provide information identifying for input (e.g., utterances).

In certain aspects, such as the illustrative example depicted in FIG. 6, cloud infrastructure system 605 may comprise an order management subsystem (OMS) 650 that is configured to process the new order. As part of this processing, OMS 650 may be configured to: create an account for the client, if not done already; receive billing and/or accounting information from the client that is to be used for billing the client for providing the requested service to the client; verify the client information; upon verification, book the order for the client; and orchestrate various workflows to prepare the order for provisioning.

Once properly validated, OMS 650 may then invoke the order provisioning subsystem (OPS) 655 that is configured to provision resources for the order including processing, memory, and networking resources. The provisioning may include allocating resources for the order and configuring the resources to facilitate the service requested by the client order. The way resources are provisioned for an order and the type of the provisioned resources may depend upon the type of cloud service that has been ordered by the client. For example, according to one workflow, OPS 655 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the requesting client for providing the requested service.

Cloud infrastructure system 605 may itself internally use services 670 that are shared by different components of cloud infrastructure system 605 and which facilitate the provisioning of services by cloud infrastructure system 605. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like. As depicted in the illustrative example in FIG. 6, cloud infrastructure system 605 may include infrastructure resources 665 that can be utilized for facilitating the provision of various cloud services offered by cloud infrastructure system 605. Infrastructure resources 665 may include, for example, processing resources, storage or memory resources, networking resources, and the like. Cloud infrastructure system 605 may send a response or notification 680 to the requesting client to indicate when the requested service is now ready for use. In some instances, information (e.g., a link) may be sent to the client that enables the client to start using and availing the benefits of the requested services.

Cloud infrastructure system 605 may provide services to multiple clients in parallel. Cloud infrastructure system 605 may store information for these clients, including possibly proprietary information. In certain aspects, cloud infrastructure system 605 comprises an identity management subsystem (IMS) 660 that is configured to manage client's information and provide the separation of the managed information such that information related to one client is not accessible by another client. IMS 660 may be configured to provide various security-related services, such as identity services, such as information access management, authentication and authorization services, services for managing client identities and roles and related capabilities, and the like.

Figure 7:
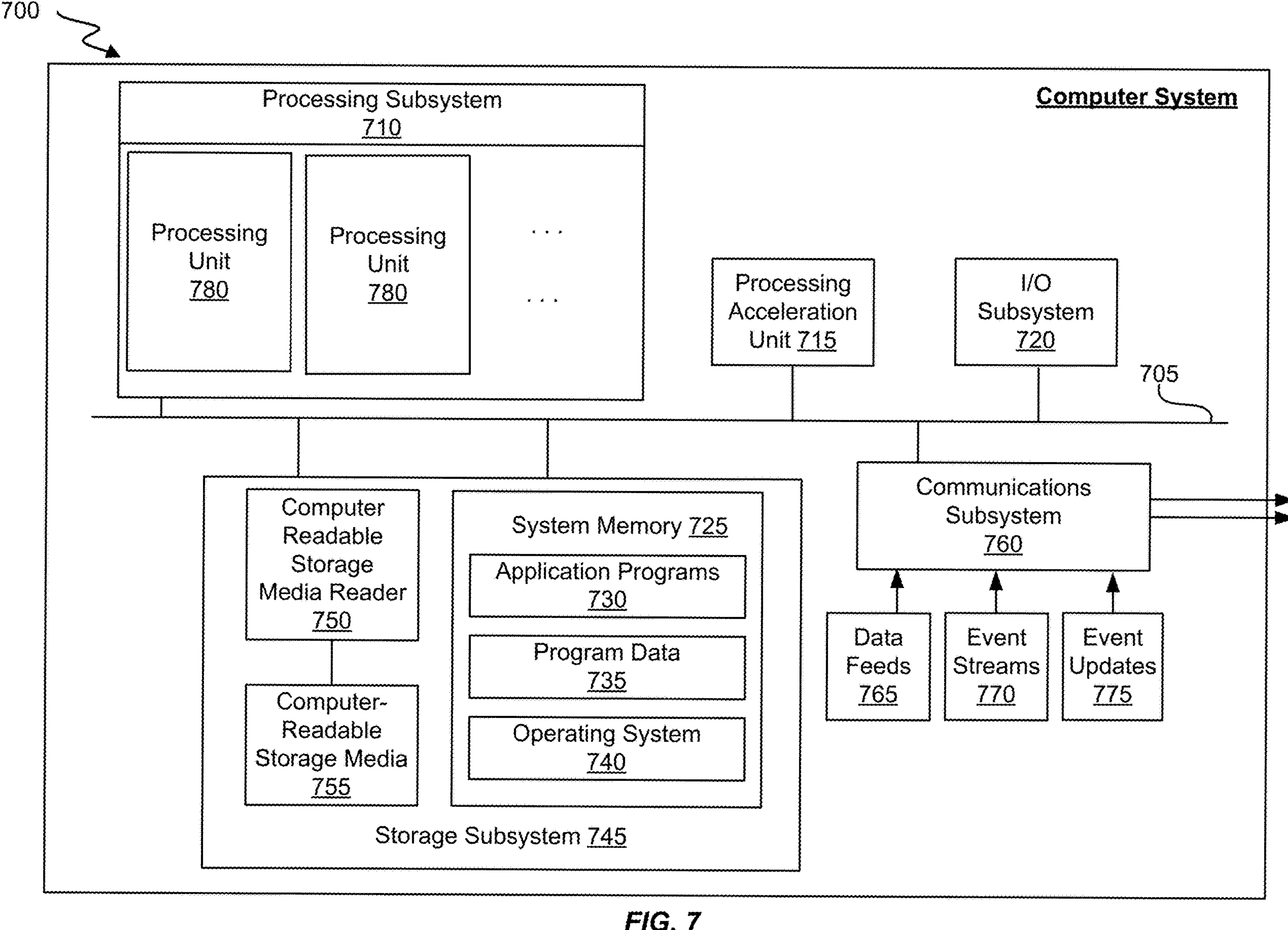
FIG. 7 illustrates an exemplary computer system to implement some aspects of the present disclosure.

FIG. 7 illustrates an exemplary computer system 700 that may be used to implement certain aspects of the present disclosure. For example, a computer system 700 may facilitate the integration of a GenAI platform with the cloud by provisioning and configuring resources, managing data, implementing security measures, monitoring performance, and enabling scalability. It may serve as the foundational infrastructure, enabling seamless deployment and operation of AI applications within the cloud environment while providing flexibility and scalability to adapt to changing computational demands efficiently. In some aspects, computer system 700 may be used to implement various servers as described above. As shown in FIG. 7, computer system 700 may include various subsystems including a processing subsystem 710 that communicates with a few other subsystems via a bus subsystem 705. These other subsystems may include a processing acceleration unit 715, an I/O subsystem 720, a storage subsystem 745, and a communications subsystem 760. Storage subsystem 745 may include non-transitory computer-readable storage media including storage media 755 and a system memory 725.

Bus subsystem 705 provides a mechanism for letting the various components and subsystems of computer system 700 communicate with each other as intended. Although bus subsystem 705 is shown schematically as a single bus, alternative aspects of the bus subsystem may utilize multiple buses. Bus subsystem 705 may be any of several types of bus structures including a memory bus or memory controller, a peripheral bus, a local bus using any of a variety of bus architectures, and the like. For example, such architectures may include an industry standard architecture (ISA) bus, micro channel architecture (MCA) bus, enhanced ISA (EISA) bus, video electronics standards association (VESA) local bus, and peripheral component interconnect (PCI) bus, which can be implemented as a Mezzanine bus manufactured to the IEEE P1386.1 standard, and the like.

Processing subsystem 710 controls the operation of computer system 700 and may comprise one or more processors, application specific integrated circuits (ASICs), or field programmable gate arrays (FPGAs). The processors may include single core or multicore processors. The processing resources of computer system 700 can be organized into one or more processing units 780, 780, etc. A processing unit may include one or more processors, one or more cores from the same or different processors, a combination of cores and processors, or other combinations of cores and processors. In some aspects, processing subsystem 710 can include one or more special purpose co-processors, such as graphics processors, digital signal processors (DSPs), or the like. In some aspects, some or all of the processing units of processing subsystem 710 can be implemented using customized circuits, such as application specific integrated circuits (ASICs), or field programmable gate arrays (FPGAs).

In some aspects, the processing units in processing subsystem 710 can execute instructions stored in system memory 725 or on computer readable storage media 755. In various aspects, the processing units can execute a variety of programs or code instructions and can maintain multiple concurrently executing programs or processes. At any given time, some, or all of the program code to be executed can be resident in system memory 725 and/or on computer-readable storage media 755 including potentially on one or more storage devices. Through suitable programming, processing subsystem 710 can provide various functionalities described above. In instances where computer system 700 is executing one or more virtual machines, one or more processing units may be allocated to each virtual machine.

In certain aspects, a processing acceleration unit 715 may optionally be provided for performing customized processing or for off-loading some of the processing performed by processing subsystem 710 to accelerate the overall processing performed by computer system 700.

I/O subsystem 720 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices, such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices, such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices, such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices, such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices, such as computed tomography, magnetic resonance imaging, position emission tomography, and medical ultrasonography devices. User interface input devices may also include, for example, audio input devices, such as MIDI keyboards, digital musical instruments, and the like.

In general, use of the term output device is intended to include all possible types of devices and mechanisms for outputting information from computer system 700 to a user or other computer. User interface output devices may include a display subsystem, indicator lights, or non-visual displays, such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics, and audio/video information, such as monitors, printers, speakers, headphones, automotive navigation systems, plotters, voice output devices, and modems.

Storage subsystem 745 provides a repository or data store for storing information and data that is used by computer system 700. Storage subsystem 745 provides a tangible non-transitory computer-readable storage medium for storing the basic programming and data constructs that provide the functionality of some aspects. Storage subsystem 745 may store software (e.g., programs, code modules, instructions) that when executed by processing subsystem 710 provides the functionality described above. The software may be executed by one or more processing units of processing subsystem 710. Storage subsystem 745 may also provide a repository for storing data used in accordance with the teachings of this disclosure.

Storage subsystem 745 may include one or more non-transitory memory devices, including volatile and non-volatile memory devices. As shown in FIG. 7, storage subsystem 745 includes a system memory 725 and a computer-readable storage media 755. System memory 725 may include a number of memories including a volatile main random-access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 710. In some implementations, system memory 725 may include multiple different types of memory, such as static random-access memory (SRAM), dynamic random-access memory (DRAM), and the like.

By way of example, and not limitation, as depicted in FIG. 7, system memory 725 may load application programs 730 that are being executed, which may include various applications, such as Web browsers, mid-tier applications, relational database management systems (RDBMS), etc., program data 735, and an operating system 740. By way of example, operating system 740 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems, such as iOS, Windows® Phone, Android® OS, BlackBerry® OS, Palm® OS operating systems, and others.

Computer-readable storage media 755 may store programming and data constructs that provide the functionality of some aspects. Computer-readable media 755 may provide storage of computer-readable instructions, data structures, program modules, and other data for computer system 700. Software (programs, code modules, instructions) that, when executed by processing subsystem 710 provides the functionality described above, may be stored in storage subsystem 745. By way of example, computer-readable storage media 755 may include non-volatile memory, such as a hard disk drive, a magnetic disk drive, an optical disk drive, such as a CD ROM, digital video disc (DVD), a Blu-Ray® disk, or other optical media. Computer-readable storage media 1255 may include, but is not limited to, Zip® drives, flash memory cards, universal serial bus (USB) flash drives, secure digital (SD) cards, DVD disks, digital video tape, and the like. Computer-readable storage media 755 may also include, solid-state drives (SSD) based on non-volatile memory, such as flash-memory based SSDs, enterprise flash drives, solid state ROM, and the like, SSDs based on volatile memory, such as solid state RAM, dynamic RAM, static RAM, dynamic random access memory (DRAM)-based SSDs, magneto resistive RAM (MRAM) SSDs, and hybrid SSDs that use a combination of DRAM and flash memory based SSDs.

In certain aspects, storage subsystem 745 may also include a computer-readable storage media reader 750 that can further be connected to computer-readable storage media 755. The computer-readable storage media reader 750 may receive and be configured to read data from a memory device, such as a disk, a flash drive, etc.

In certain aspects, computer system 700 may support virtualization technologies, including but not limited to virtualization of processing and memory resources. For example, computer system 700 may provide support for executing one or more virtual machines. In certain aspects, computer system 700 may execute a program, such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 760 provides an interface to other computer systems and networks. Communications subsystem 760 serves as an interface for receiving data from and transmitting data to other systems from computer system 700. For example, communications subsystem 760 may enable computer system 700 to establish a communication channel to one or more client devices via the Internet for receiving and sending information from and to the client devices. For example, the communication subsystem may be used to transmit a response to a user regarding the inquiry for a Chabot.

Communication subsystem 760 may support both wired and/or wireless communication protocols. For example, in certain aspects, communications subsystem 760 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects, communications subsystem 760 can provide wired network connectivity (e.g., Ethernet) in addition to or instead of a wireless interface.

Communication subsystem 760 can receive and transmit data in various forms. For example, in some aspects, in addition to other forms, communications subsystem 760 may receive input communications in the form of data feeds 765 such as structured and/or unstructured data feeds, event streams 770, event updates 775, and the like. For example, communications subsystem 760 may be configured to receive (or send) data feeds 765 in real-time from users of social media networks and/or other communication services, such as Twitter® feeds, Facebook® updates, web feeds, such as Rich Site Summary (RSS) feeds, and/or real-time updates from one or more third party information sources.

In certain aspects, communications subsystem 760 may be configured to receive data in the form of continuous data streams, which may include event streams 770 of real-time events and/or event updates 775, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 760 may also be configured to communicate data from computer system 700 to other computer systems or networks. The data may be communicated in various forms, such as structured and/or unstructured data feeds 765, event streams 770, event updates 775, and the like to one or more databases that may be in communication with one or more streaming data source computers coupled to computer system 700.

Computer system 700 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in art can appreciate other ways and/or methods to implement the various aspects.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

In some embodiments, a system is provided that includes one or more means to perform part or all of one or more methods or processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

The present description provides preferred exemplary embodiments only, and is not intended to limit the scope, applicability or configuration of the disclosure. Rather, the description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The invention claimed is:

1. A computer-implemented method comprising:
- accessing a prompt that is associated with a logical reasoning problem;
- generating one or more logical steps of a logical response based on the prompt by using a generative artificial intelligence (GenAI) model;
- for each of the one or more logical steps of the logical response:
  - querying one or more theorem solvers using the logical response and the logical reasoning problem, wherein the one or more theorem solvers include proof checkers and theorem provers;
  - processing, using parallel execution of the proof checkers and the theorem provers, the one or more logical steps of the logical response to verify axioms or rules associated with each logical step of the one or more logical steps;
  - receiving, in response to the query, one or more feedback from the one or more theorem solvers corresponding to the logical response of the logical reasoning problem; and
  - modifying, in response to the one or more feedback, the logical response by regenerating the one or more logical steps:
- determining that the logical response is complete and verified from the one or more theorem solvers; and
- outputting, in response to determining that the logical response is complete and verified, the logical response on a user interface.

2. The computer-implemented method of claim 1, wherein the one or more theorem solvers include satisfiability (SAT) based theorem solvers.

3. The computer-implemented method of claim 1, wherein the one or more theorem solvers further include proof checkers.

4. The computer-implemented method of claim 1, wherein the prompt is generated by a user using the user interface.

5. The computer-implemented method of claim 1, wherein the GenAI model includes a retrieval-augmented generation (RAG) model, a fine-tuned transformer model, or a domain-specific model that is trained on domain-specific data.

6. The computer-implemented method of claim 1, wherein the one or more feedback from the one or more theorem solvers includes whether a logical step of the logical response is reachable based on a set of premises (or justification) and/or whether rules or axioms of natural deduction are correctly utilized.

7. The computer-implemented method of claim 1, wherein querying the one or more theorem solvers using the logical response and the logical reasoning problem further includes:
- generating, for each of the one or more theorem solvers and based on the logical response, a set of logical statements, wherein the set of logical statements are in a format that is understandable by a corresponding theorem solver.

8. A system comprising:
- one or more data processors; and
- a non-transitory computer readable storage medium containing instructions which, when executed on the one or more data processors, cause the one or more data processors to perform a set of operations including:
  - accessing a prompt that is associated with a logical reasoning problem;
  - generating one or more logical steps of a logical response based on the prompt by using a generative artificial intelligence (GenAI) model;
  - for each of the one or more logical steps of the logical response:
    - querying one or more theorem solvers using the logical response and the logical reasoning problem, wherein the one or more theorem solvers include proof checkers and theorem provers:
    - processing, using parallel execution of the proof checkers and the theorem provers, the one or more logical steps of the logical response to verify axioms or rules associated with each logical step of the one or more logical steps:
    - receiving, in response to the query, one or more feedback from the one or more theorem solvers corresponding to the logical response of the logical reasoning problem; and modifying, in response to the one or more feedback, the logical response by regenerating the one or more logical steps;

determining that the logical response is complete and verified from the one or more theorem solvers; and outputting, in response to determining that the logical response is complete and verified, the logical response on a user interface.

9. The system of claim 8, wherein the one or more theorem solvers include satisfiability (SAT) based theorem solvers.

10. The system of claim 8, wherein the one or more theorem solvers further include proof checkers.

11. The system of claim 8, wherein the prompt is generated by a user using the user interface.

12. The system of claim 8, wherein the GenAI model includes a retrieval-augmented generation (RAG) model, a fine-tuned transformer model, or a domain-specific model that is trained on domain-specific data.

13. The system of claim 8, wherein the one or more feedback from the one or more theorem solvers includes whether a logical step of the logical response is reachable based on a set of premises (or justification) and/or whether rules or axioms of natural deduction are correctly utilized.

14. The system of claim 8, wherein querying the one or more theorem solvers using the logical response and the logical reasoning problem further includes:

generating, for each of the one or more theorem solvers and based on the logical response, a set of logical statements, wherein the set of logical statements are in a format that is understandable by a corresponding theorem solver.

15. A non-transitory machine-readable storage medium storing a computer-program product tangibly including instructions configured to cause one or more data processors to:

access, a prompt that is associated with a logical reasoning problem;

generate, one or more logical steps of a logical response based on the prompt by using a generative artificial intelligence (GenAI) model;

for each of the one or more logical steps of the logical response:

querying, one or more theorem solvers using the logical response and the logical reasoning problem; wherein the one or more theorem solvers include proof checkers and theorem provers;

processing, using parallel execution of the proof checkers and the theorem provers, the one or more logical steps of the logical response to verify axioms or rules associated with each logical step of the one or more logical steps;

receiving, in response to the query, one or more feedback from the one or more theorem solvers corresponding to the logical response of the logical reasoning problem; and modifying, in response to the one or more feedback, the logical response by regenerating the one or more logical steps:

determine that the logical response is complete and verified from the one or more theorem solvers; and output, in response to determining that the logical response is complete and verified, the logical response on a user interface.

16. The computer-program product of claim 15, wherein the one or more theorem solvers include satisfiability (SAT) based theorem solvers.

17. The computer-program product of claim 15, wherein the one or more theorem solvers further include proof checkers.

18. The computer-program product of claim 15, wherein the prompt is generated by a user using the user interface.

19. The computer-program product of claim 15, wherein the GenAI model includes a retrieval-augmented generation (RAG) model, a fine-tuned transformer model, or a domain-specific model that is trained on domain-specific data.

20. The computer-program product of claim 15, wherein the one or more feedback from the one or more theorem solvers includes whether a logical step of the logical response is reachable based on a set of premises (or justification) and/or whether rules or axioms of natural deduction are correctly utilized.

* * * * *